(12) United States Patent
Anikitchev et al.

(10) Patent No.: US 8,988,674 B2
(45) Date of Patent: Mar. 24, 2015

(54) SYSTEMS AND METHODS FOR MEASURING HIGH-INTENSITY LIGHT BEAMS

(71) Applicant: Ultratech, Inc., San Jose, CA (US)

(72) Inventors: Serguei Anikitchev, Belmont, CA (US); David Gaines, Livermore, CA (US)

(73) Assignee: Ultratech, Inc., San Jose, CA (US)

( * ) Notice: Subject to any disclaimer, the term of this patent is extended or adjusted under 35 U.S.C. 154(b) by 17 days.

(21) Appl. No.: 13/953,423

(22) Filed: Jul. 29, 2013

(65) Prior Publication Data

US 2015/0029497 A1    Jan. 29, 2015

(51) Int. Cl.
*G01J 1/04* (2006.01)

(52) U.S. Cl.
CPC ........ *G01J 1/0407* (2013.01); *G01J 2001/0481* (2013.01)
USPC ....................................................... 356/236

(58) Field of Classification Search
CPC ... G01N 21/9501; G01N 21/47; G01N 21/53; G01N 21/645; G01N 21/6486; G01N 21/94; G01N 15/0211; G01N 1/24; G01N 2021/6467; G01N 21/05; G01N 21/21; G01N 21/278; G01N 21/95607
See application file for complete search history.

(56) References Cited

U.S. PATENT DOCUMENTS

| | | | |
|---|---|---|---|
| 3,704,934 A | 12/1972 | Holmes et al. | |
| 4,333,173 A * | 6/1982 | Yonezawa et al. | 369/44.13 |
| 4,342,050 A | 7/1982 | Traino | |
| 4,565,426 A | 1/1986 | Cullen | |
| 4,573,792 A * | 3/1986 | Kajiyama et al. | 356/301 |
| 4,711,526 A | 12/1987 | Hennings et al. | |
| 4,797,555 A | 1/1989 | La Mar | |
| 4,828,384 A | 5/1989 | Plankenhorn et al. | |
| 4,848,902 A | 7/1989 | Schickle | |
| 5,100,231 A | 3/1992 | Sasnett et al. | |
| 5,408,553 A | 4/1995 | English et al. | |
| 5,590,148 A | 12/1996 | Szarmes | |
| 5,959,733 A | 9/1999 | Wei et al. | |
| 6,130,753 A | 10/2000 | Hopkins, Jr. | |
| 6,177,995 B1 | 1/2001 | Compain et al. | |
| 7,049,544 B2 | 5/2006 | Landau | |
| 8,237,922 B2 | 8/2012 | Scaggs | |
| 8,441,625 B2 | 5/2013 | Wick, Jr. | |
| 8,619,247 B1 | 12/2013 | Scaggs | |

FOREIGN PATENT DOCUMENTS

| | | |
|---|---|---|
| EP | 0605055 A2 | 8/1997 |
| WO | WO 2011/127400 | 10/2011 |

OTHER PUBLICATIONS

Search Report from the Intellectual Property Office of Singapore (dated Nov. 28, 2014) for counterpart Singapore Patent Application No. 10201403901S.

* cited by examiner

*Primary Examiner* — Michael P Stafira
(74) *Attorney, Agent, or Firm* — Opticus IP Law PLLC (57) ABSTRACT

Systems and methods for measuring an intensity characteristic of a light beam are disclosed. The methods include directing the light beam into a prism assembly that includes a thin prism sandwiched by two transparent plates, and reflecting a portion of the light beam by total-internal-reflection surface to an integrating sphere while transmitting the remaining portion of the light beam through the two transparent plates to a beam dump. The method also includes detecting light captured by the integrating sphere and determining the intensity characteristic from the detected light.

22 Claims, 13 Drawing Sheets

SYSTEMS AND METHODS FOR MEASURING HIGH-INTENSITY LIGHT BEAMS

FIELD

The present disclosure relates to measuring the intensity of light beams, and in particular relates to systems and methods for measuring at least one intensity characteristic of a high-intensity light beam.

BACKGROUND

High-intensity (or high-optical-power) light beams are used in many applications, including thermal processing of semiconductor substrates. Most applications require the high-intensity light beam to have a well-defined intensity profile. For example, in laser annealing applications, the high-intensity beam forms a line image and has a generally Gaussian intensity distribution along the short axis and a generally uniform intensity distribution along the long axis. Typical dimensions for the line image used in thermal processing of semiconductor substrates are hundreds of microns in width (short axis) by a few tens of millimeters in length (long axis). The amount of power in such line images can reach a few kilowatts.

It is difficult to accurately measure intensity characteristics, such as an intensity profile, of such high-intensity light beams because the light beam damages the measurement apparatus. One type of measurement apparatus uses image sensors and an attenuator to attenuate the high-intensity beam down to a reasonable (non-damaging) power level and then directs the attenuated light beam to a photodetector such as a CCD or CMOS camera.

Unfortunately, this approach suffers from significant inaccuracies because attenuation is always accompanied by aberrations and because measurements at low power do not accurately represent the intensity profile distributions realized at the high power at which the light beam is actually used.

Another type of measurement approach is based on scanning the high-intensity light beam past a narrow aperture (e.g., a slit aperture) formed by opposing blades. When high-power densities are involved, however, the measurement needs to be carried out at low-power settings. This reduces the measurement accuracy for essentially the same reason as the image-sensor-based measurement methods. On the other hand, trying to measure the intensity profile at high power to get an accurate measurement typically results in overheating and thereby damaging the blades. Thermal expansion of the blade material can also change the size and/or shape of the slit opening and compromises the measurement. This can occur even at low power.

Measurements of the short-axis intensity profile of a line-forming light beam are even more challenging than the long-axis measurements because scanning in the short axis direction requires a very small slit or even a pinhole. Thermal expansion of a small aperture is more pronounced than thermal expansion of a large aperture. For this reason, measurements of the intensity profile along the short axis of a line-forming light beam are usually done using cameras with a large degree of attenuation or even below the laser threshold. But, as noted above, the measurement accuracy suffers.

SUMMARY

Aspects of the disclosure are directed to measuring at least one intensity characteristic of a high-intensity light beam. Example intensity characteristics include an intensity profile (power/unit area as a function of at least one spatial coordinate), an overall or total intensity (power/unit area), and optical power (intensity x area). In the discussion, the term "power" means "optical power" unless otherwise noted.

An aspect of the disclosure is a method of measuring an intensity characteristic of a light beam. The method includes: directing the light beam into a prism assembly that includes a thin prism sandwiched by two transparent plates, wherein the thin prism has a width d and a total-internal-reflecting (TIR) surface having an area; reflecting a portion of the light beam by the TIR surface to an integrating sphere while transmitting the remaining portion of the light beam through the two transparent plates to a beam dump; detecting a portion of the light captured by the integrating sphere; and determining an intensity characteristic of the light beam from the detected light.

Another aspect of the disclosure is the method as described above, wherein the detection of the portion of the light captured by the integrating sphere measures an amount of optical power, and further includes determining an intensity by dividing a measured amount of optical power by the area of the TIR surface.

Another aspect of the disclosure is the method as described above, further comprising repeating the acts therein to measure an intensity for different sections of the light beam to determine an intensity profile for the light beam.

Another aspect of the disclosure is the method as described above, further comprising translating the light beam relative to the prism assembly to measure the intensity for the different sections of the light beam.

Another aspect of the disclosure is the method as described above, wherein the light beam comprises a line-forming beam that forms a line image.

Another aspect of the disclosure is the method as described above, wherein the width d of the TIR prism is in the range from 0.05 mm to 1 mm.

Another aspect of the disclosure is the method as described above, wherein the transparent plates have a substantially pentagonal shape and the thin prism has a substantially trapezoidal shape.

Another aspect of the disclosure is the method as described above, wherein the thin prism has input and output surfaces configured so that the light beam passes through the input surface at substantially a right angle and the reflected portion of the light beam passes through the output surface at substantially a right angle.

Another aspect of the disclosure is the method as described above, wherein the input and output surfaces of the thin prism are coated with an anti-reflection coating.

Another aspect of the disclosure is the method as described above, wherein the thin prism and transparent plates have light-transmitting surfaces and wherein the light-transmitting surfaces are coated with an anti-reflection coating.

Another aspect of the disclosure is the method as described above, wherein directing the light beam into a prism assembly includes focusing the light beam so that it substantially focuses at the TIR surface.

Another aspect of the disclosure is the method as described above, wherein the light beam has an amount of optical power between 10 W and 5 kW.

Another aspect of the disclosure is a system for measuring an intensity characteristic of a light beam. The system includes: a prism assembly arranged to receive the light beam at an input side, the prism assembly including a thin prism sandwiched by two transparent plates, wherein the thin prism has a width d and a total-internal-reflecting (TIR) surface, wherein the TIR surface reflects a portion of the light beam, thereby defining an unreflected portion of the light beam; an integrating sphere arranged adjacent a first output side of the prism assembly to receive the reflected portion of the light beam; a beam dump arranged adjacent a second output side of the prism assembly and arranged to receive the unreflected portion of the light beam; a photodetector operably arranged relative to the integrating sphere and adapted to measure an amount of optical power received by the integrating sphere and generate an electrical detector signal representative of the measured amount of optical power; and a processor electrically connected to the photodetector and that includes instructions embodied in a computer-readable medium that cause the processor to determine the intensity characteristic of the reflected portion of the light beam.

Another aspect of the disclosure is the system as described above, wherein the TIR surface has an area and wherein the processor determines an intensity by dividing the measured amount of optical power by the TIR surface area.

Another aspect of the disclosure is the system as described above, wherein the width d of the TIR prism is in the range from 0.05 mm to 1 mm (i.e., 0.05 mm≤d≤1 mm).

Another aspect of the disclosure is the system as described above, further comprising a movable stage that movably supports the prism assembly relative to the light beam.

Another aspect of the disclosure is the system as described above, wherein the transparent plates have a substantially pentagonal shape and the thin prism has a substantially trapezoidal shape.

Another aspect of the disclosure is the system as described above, wherein the thin prism has input and output surfaces configured so that the light beam passes through the input surface at substantially a right angle and the reflected portion of the light beam passes through the output surface at substantially a right angle.

Another aspect of the disclosure is the system as described above, wherein the thin prism and transparent plates have light-transmitting surfaces and wherein the light-transmitting surfaces are coated with an anti-reflection coating.

Another aspect of the disclosure is the system as described above, wherein the light beam is substantially focused at the TIR surface.

Another aspect of the disclosure is the system as described above, further comprising means for scanning the light beam relative to the prism assembly.

Another aspect of the disclosure is the system as described above, wherein the light beam has an amount of optical power between 100 W and 5 kW.

Additional features and advantages will be set forth in the Detailed Description that follows and in part will be readily apparent to those skilled in the art from the description or recognized by practicing the embodiments as described in the written description and claims thereof, as well as the appended drawings. It is to be understood that both the foregoing general description and the following Detailed Description are merely exemplary and are intended to provide an overview or framework for understanding the nature and character of the claims.

BRIEF DESCRIPTION OF THE DRAWINGS

The accompanying drawings are included to provide a further understanding and are incorporated into and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

The entire disclosure of any publication or patent document mentioned herein is incorporated by reference.

Cartesian coordinates are shown in some of the Figures for the sake of reference and are not intended to be limiting as to direction or orientation.

Figure 1A:
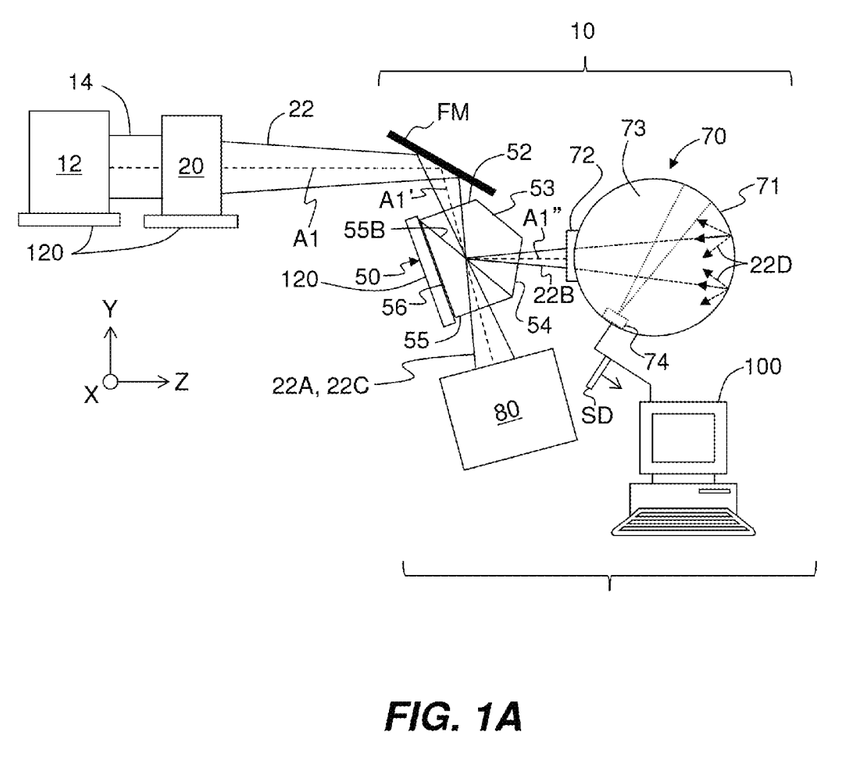
FIGS. 1A and 1B are diagrams of two example embodiments of light-beam-intensity measuring systems according to the disclosure.
Figure 1B:
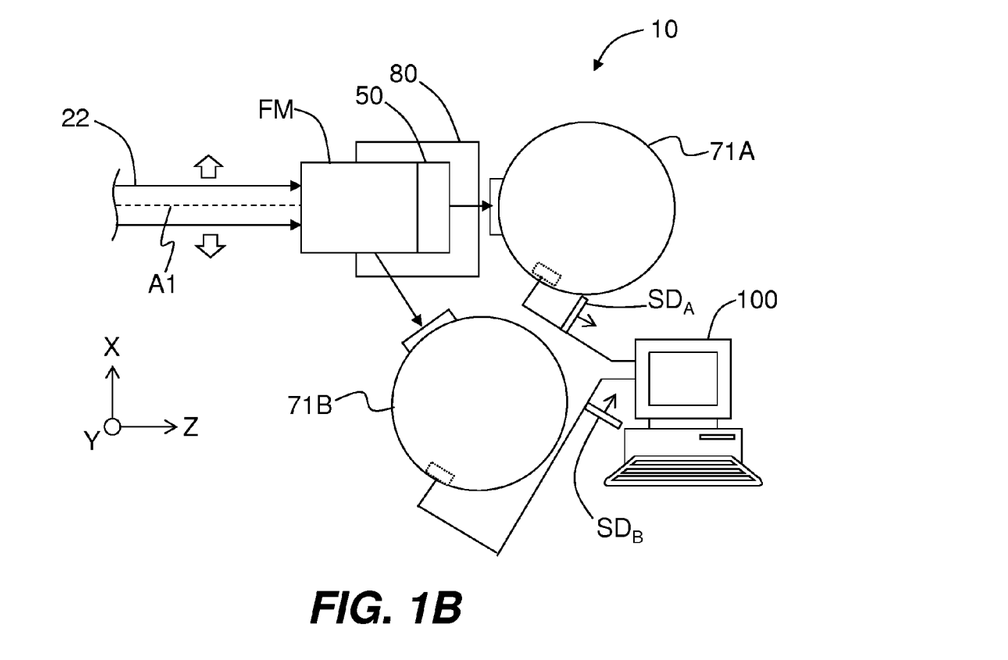

FIGS. 1A and 1B are diagrams of two example embodiments of a light-beam-intensity measuring system ("system") 10. The system 10 is configured to receive and process a relatively high-intensity or high-optical-power light beam ("light beam") 22, e.g., a light beam having an optical power of at least 10 W and in a further example of up to 5 kW.

FIG. 1A shows an example of how light beam 22 can be formed. A light source 12 emits an initial light beam 14 of a wavelength λ along an optical axis A1. The light source 12 may include a laser, such as a diode laser, that emits the high-power initial laser beam 14, where the wavelength λ is nominally between 0.8 and 1 microns. A beam-forming optical system 20 receives the initial light beam 14 and forms light beam 22 to be used for a given application, such as laser annealing or another type of material processing.

Figure 2:
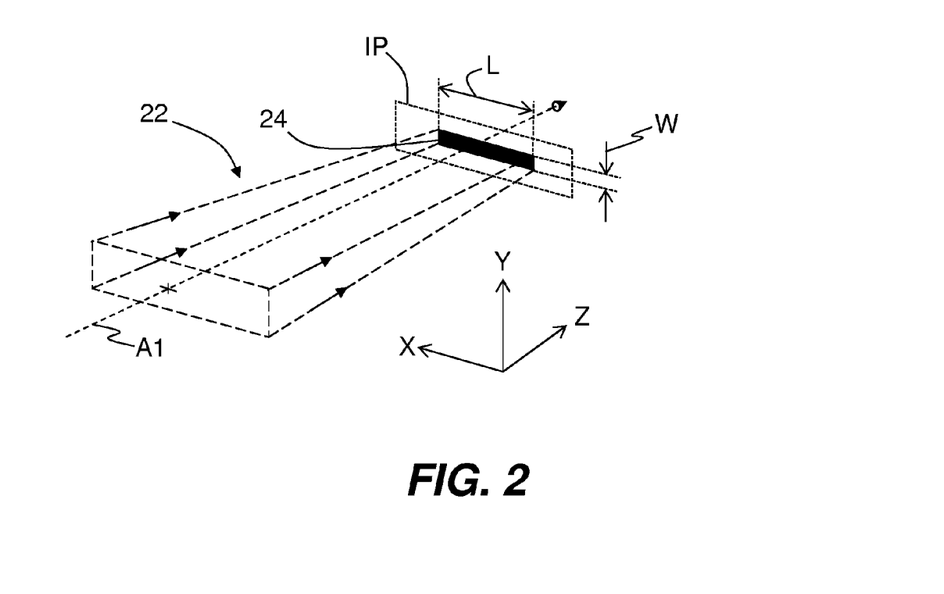
FIG. 2 is a close-up view of an example line-forming beam and the focused line image it forms at an image plane.

In an example embodiment, light beam 22 has a location along the length (i.e., direction of travel) at which it is narrowest, i.e., the light beam forms a line image 24 at an image plane IP, as illustrated in the close-up view of FIG. 2. In the example shown in FIG. 2, light beam 22 is a convergent or focused light beam that forms line image 24 of a length L in the X-direction and a width W in the Y-direction.

In the discussion below, image 24 in the form of a line (i.e., a "line image") is used by way of non-limiting example to facilitate the discussion of the systems and apparatus disclosed herein. When initial light beam 14 forms a line image, it is referred to herein as a "line-forming beam." Other types of light beams and images, including low-intensity light beams and images, or light beams and images of other shapes, can also be measured in analogous fashion. The systems and methods disclosed herein are advantageous for measuring the intensity of high-intensity light beams because the aforementioned adverse effects are generally avoided.

With reference again to FIG. 1A, system 10 also optionally includes along axis A1 a fold mirror FM that serves to fold system 10 to define a first folded optical axis A1' and that makes the system more compact. In an example, fold mirror FM is adjustable so that the direction in which folded optical axis A1' extends is also adjustable. This allows for some flexibility in where system 10 can be located relative to the direction of travel of light beam 22. In an example, fold mirror FM is configured to provide a known amount of reflectivity for a given wavelength λ or for a given wavelength band Δλ associated with light beam 22. For convenience, it is assumed that fold mirror FM causes only minimal attenuation of light beam 22.

Figure 3A:
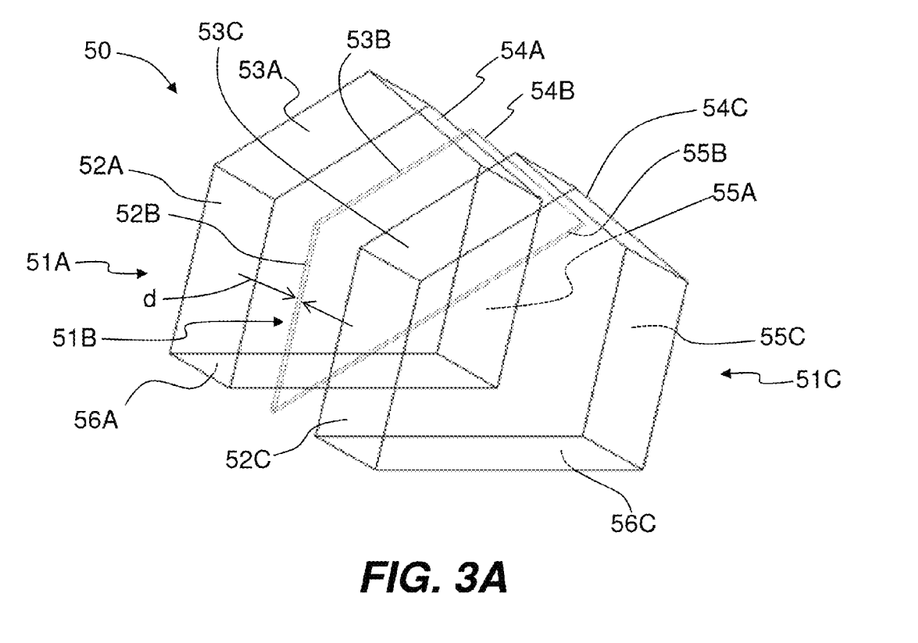
FIGS. 3A and 3B are exploded and assembled views, respectively, of an example prism assembly.
Figure 3B:
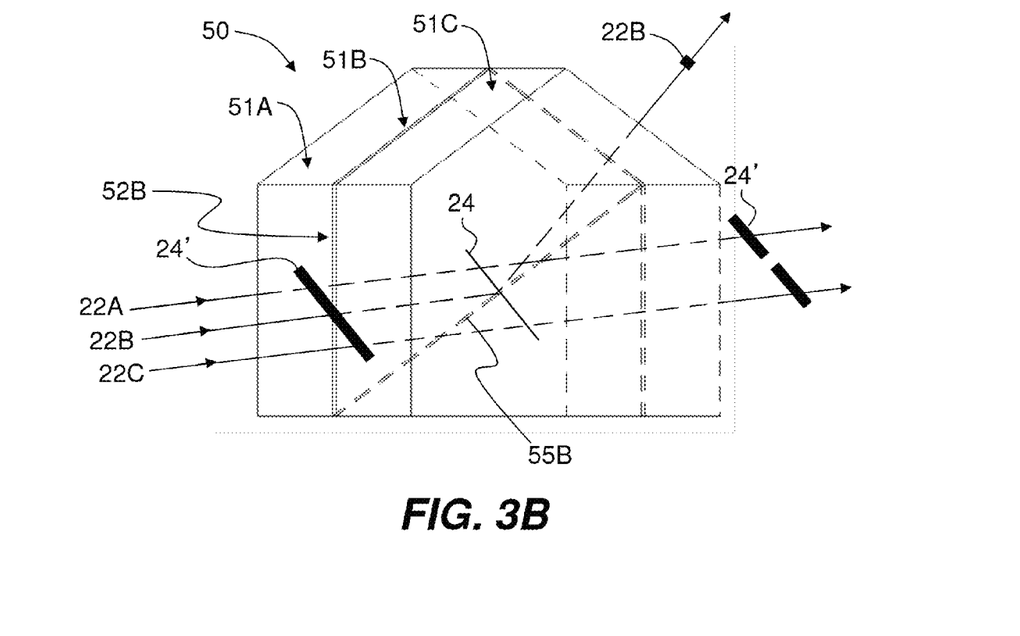

The system 10 includes along optical axis A1' a TIR prism assembly 50, which is shown in an exploded view in FIG. 3A and in an assembled view in FIG. 3B. An example TIR prism assembly 50 has five sides 52-56 (i.e., is substantially pentagonal). The TIR prism assembly 50 includes a thin planar TIR prism 51B that in an example includes four sides 52B through 55B (e.g., is substantially trapezoidal). The TIR prism 51B has a thickness d, which in an example is in the range from 0.05 mm to 1 mm and in another example is 0.25 mm to 1 mm. The TIR prism 51B is sandwiched between two plates 51A and 51C, which in an example are substantially transparent to light beam 22.

In an example, TIR prism 51B and plates 51A and 51C are made of silica. For convenience of polishing and coating, plates 51A and 51C can be shaped similarly to TIR prism 51B and can be optically contacted or glued to the TIR prism to form TIR prism assembly 50, thereby eliminating the need for adhesives, which may cause damage to the TIR prism assembly by absorbing some of light beam 22.

In an example, transparent plates 51A and 51C have five sides 52A-56A and 52C-56C, respectively. In an example, TIR prism assembly 50 is configured so that TIR prism surface 55B defines a TIR surface having an area A, as described in greater detail below. The TIR surface 55B also defines a second folded optical axis A1".

Also in an example, TIR prism assembly 50 is configured so that sides 52A, 52B and 52C reside in a common plane at side 52. The TIR prism assembly 50 is arranged so that side 52 defines an input side, while sides 54 and 55 define first and second output sides. In an example, first and second output sides 54 and 55 are at right angles to axes A1" and A1', respectively.

With reference again to FIG. 1A, system 10 includes a beam dump 80 arranged along axis A1' adjacent second output side 55. The system 10 also includes a photodetector system 70 arranged along folded optical axis A1". In an example, photodetector system 70 includes an integrating sphere 71 having an input aperture 72 and an interior 73. A photodetector 74 is operably arranged to measure diffused light 22D within interior 73 of integrating sphere 71 and in response generate an electrical detector signal SD that is representative of the detected light.

FIG. 1B is a top view of system 10, with TIR prism assembly 50 oriented as in FIG. 1A, and further illustrates an embodiment that utilizes two integrating spheres 71, denoted 71A and 71B. The integrating sphere 71A is used to measure the result of a horizontal scan, while integrating sphere 71B measures light that is totally internally-reflected during a vertical scan. For a vertical scan, fold mirror FM, TIR prism assembly 50, and beam dump 80 are rotated by 90 degrees. This automatically re-directs useful totally internally reflected light 22B into integrating sphere 71B, while integrating sphere 71A is idle during this measurement.

The system 10 also includes a processor 100, shown in the form of a computer, that receives and processes detector signals SD. In an example, processor 100 includes instructions embodied in a computer-readable medium that cause the processor to perform certain calculations as described below.

Method of Operation

Figure 4A:
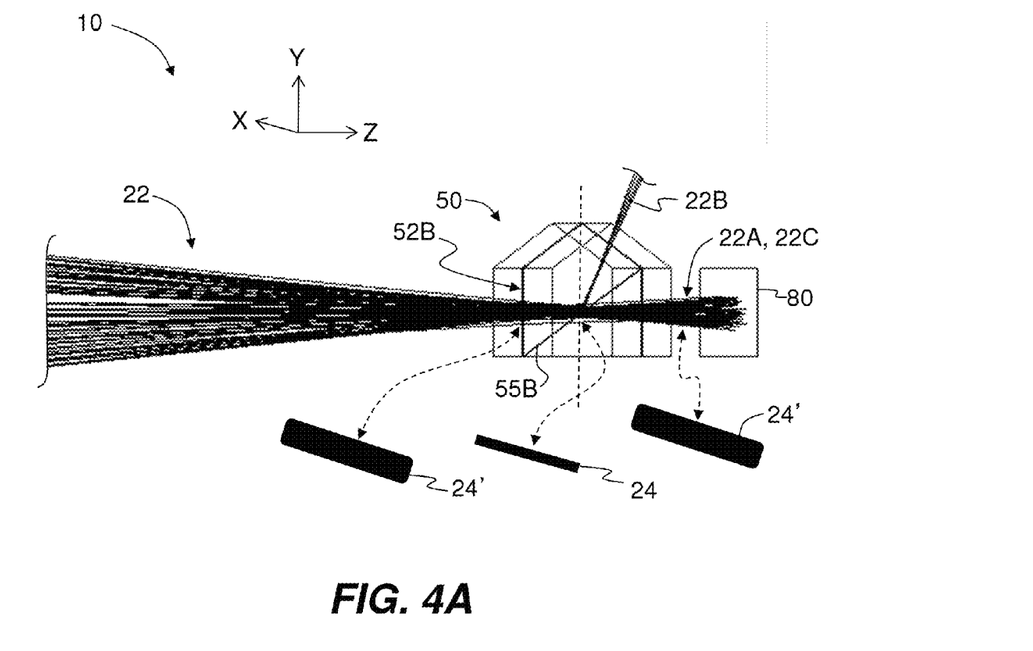
FIG. 4A is a view of the prism assembly that includes a ray trace of an example line-forming beam and the portions of the line-forming beam that are transmitted and reflected by the prism assembly.

In the operation of system 10, light beam 22 is either directed by fold mirror FM to be incident upon TIR prism assembly 50 at input side 52 or is directly incident thereon. In an example where light beam 22 is converging, the light beam focuses down to form line image 24 at TIR surface 55B. Thus, as best seen in FIG. 3B and FIG. 4A, a defocused line image 24' is formed at input side 52 and at second output side 55 of TIR prism assembly 50. This situation has the benefit of reducing the energy density at the input and output sides 52 and 55 of TIR prism assembly 50, which reduces the chance of damaging these sides.

The TIR surface 55B of TIR prism 51B is angled to reflect by TIR a relatively small portion 22B of light beam 22 to travel along axis A1" and through side 54B at first output side 54 of TIR prism assembly 50. The amount of light in reflected light beam portion 22B is defined by width d of TIR prism 51B. The TIR prism 51B can be thought of as defining a slot of width d that passes (at side 52B) and then reflects (at TIR surface 55B) light beam portion 22B.

Figure 4B:
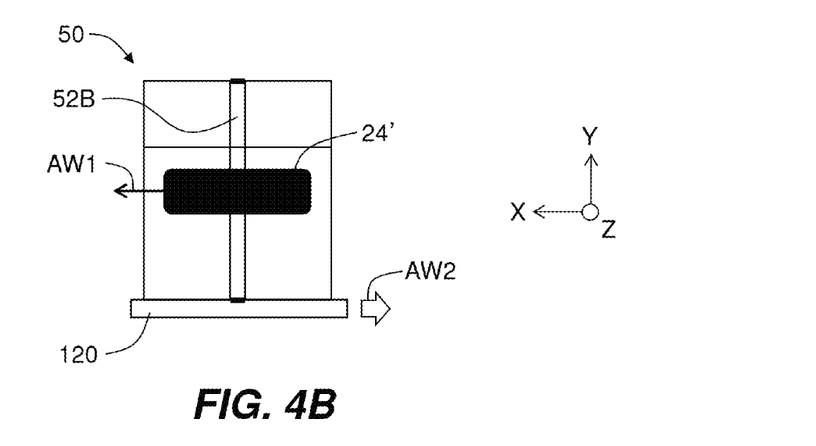
FIG. 4B is a front-end view of the prism assembly showing a defocused line image at the front side of the TIR prism assembly.

To measure an intensity profile of light beam 22, the light beam is translated relative to TIR prism assembly 50 to make multiple measurements of the light beam until the desired amount of the light beam has been sampled. This can be accomplished by translating light beam 22 (arrow AW1, FIG. 4B), by translating TIR prism assembly 50 (arrow AW2), or by a combination of these translations. In addition, beam-forming optical system 20 may be configured to translate light beam 22, or light source 12 may be configured to translate initial light beam 14 and thus translate light beam 22.

Figure 4C:
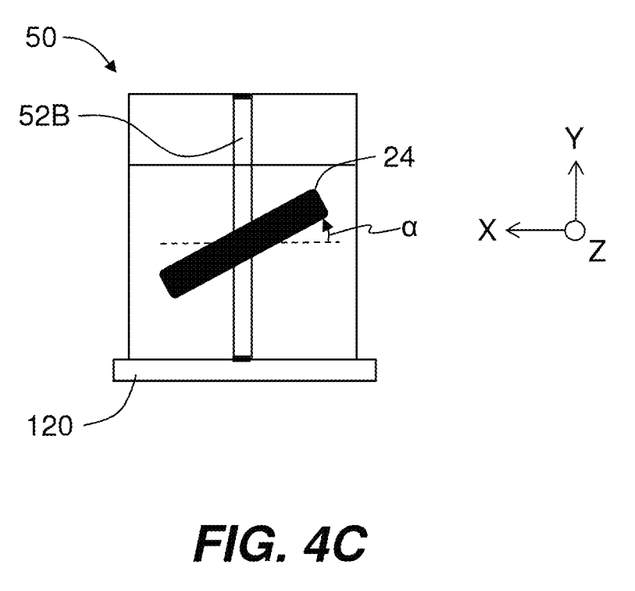
FIG. 4C is similar to FIG. 4B and shows a rotated and defocused line image at the front side of the TIR prism assembly.

In an example, movable stages 120 can be operably arranged relative to one or more of light source 12, beam-forming optical system 20 and TIR prism assembly 50 to translate light beam 22 relative to the TIR prism assembly. In other examples, one or more movable stages 120 are used to rotate light beam 22 relative to TIR prism 51B so that different azimuths (as indicated by azimuth angle α) of the light beam can be sampled, as illustrated in FIG. 4C.

Figure 5A:
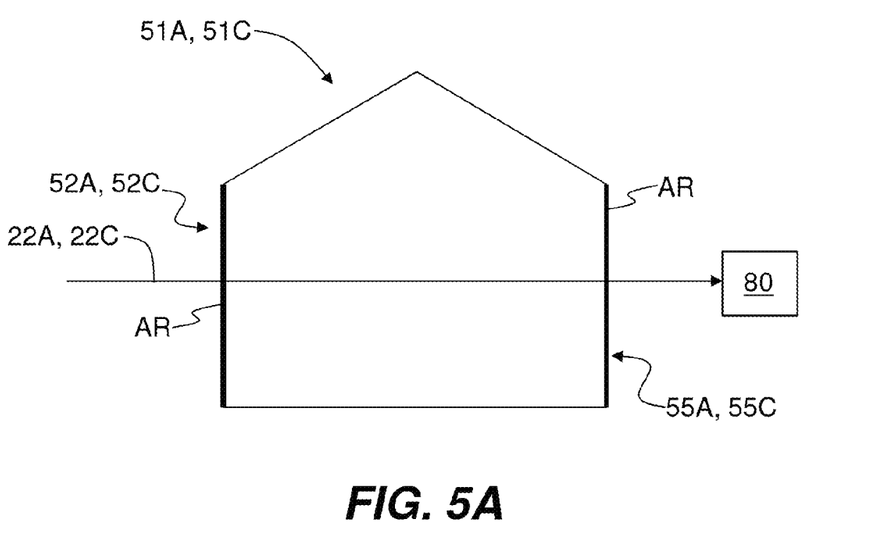
FIGS. 5A and 5B are cross-sectional views of the plates and the TIR prism, respectively, of the TIR prism assembly illustrating how one portion of the light beam is transmitted through the plates while another portion is reflected by the TIR surface of the prism.
Figure 5B:
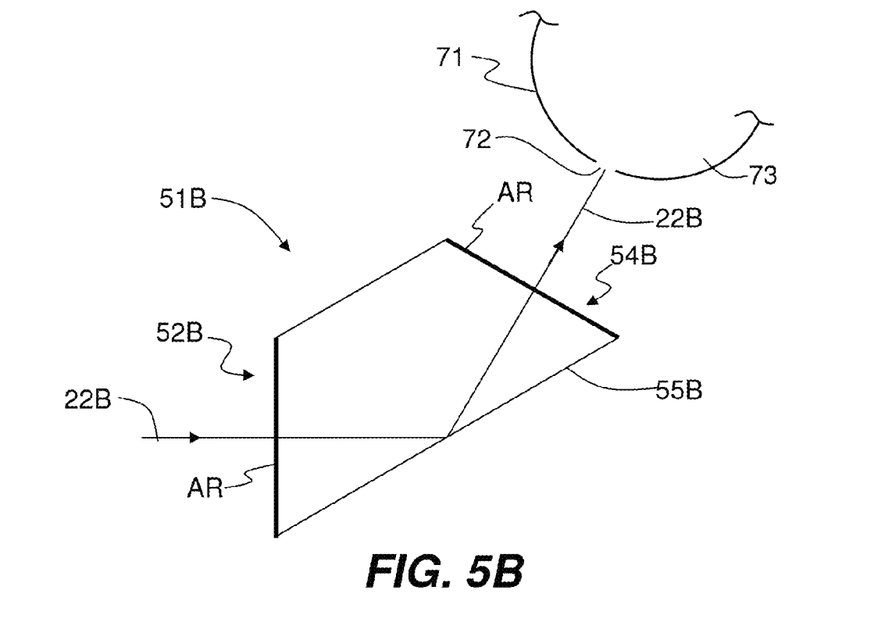

FIG. 5A illustrates how portions 22A and 22C of light beam 22 travel directly through transparent plates 51A and 51C, while FIG. 5B illustrates how light beam portion 22B reflected by TIR surface 55B is directed out of side 54B and into integrating sphere 71 via aperture 72. In example embodiments, anti-reflection coatings AR are employed on one or more of sides 52A, 52C and 55A, 55C of transparent plates 51A and 51C and on sides 52B and 54B of TIR prism 51B to optimize optical transmission.

Intensity Calculations

Figure 6A:
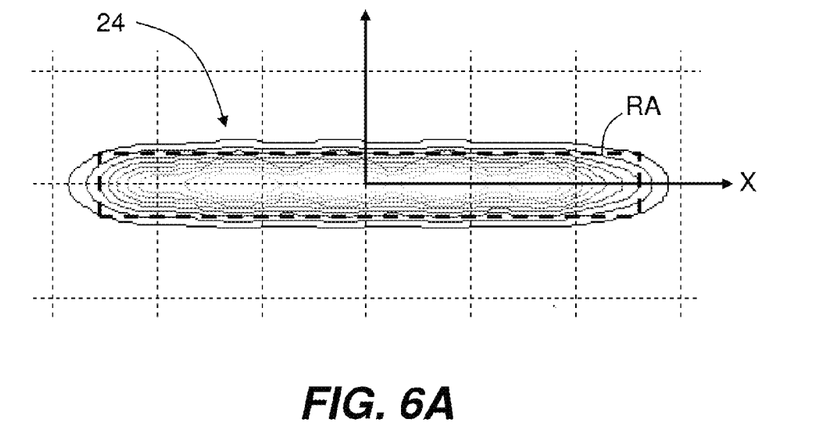
FIG. 6A is an example intensity profile of a line image formed by a line-forming beam.

FIG. 6A shows an example line image 24 as a two-dimensional intensity distribution (intensity profile) $I_H = I(x,y)$ with contours of equal intensity. The length $L_x$ and width $W = L_y$ are shown as corresponding to a rectangular approximation (dark, dashed line RA) based roughly on the third-smallest intensity contour.

Figure 6B:
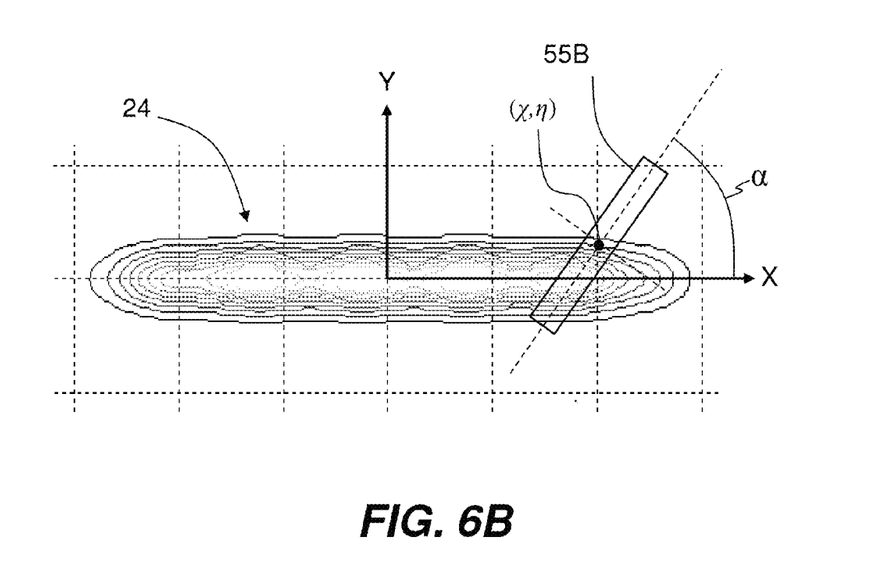
FIG. 6B is similar to FIG. 6A and shows the slot as defined by the TIR prism assembly superimposed on a portion of the line-image intensity profile.

FIG. 6B is similar to FIG. 6A but also shows a slit aperture denoted as 55B because it is effectively defined by the TIR surface. Slit aperture 55B is centered at position $(\chi, \eta)$ in an X-Y coordinate system and tilted by α with respect to X-axis. The light in line image 24 that is transmitted through slit aperture 55B (or more accurately, that is reflected by TIR surface 55B) enters integrating sphere 71, where it forms diffused light 22D. A portion of diffused light 22D is measured by photodetector 74.

The measured power P is given by:

$$P(\chi, \eta, \alpha) = C \cdot \iint_{S(\chi,\eta,\alpha)} I(x, y) dx dy.$$

The power density ρ is thus defined by P/A, or:

$$\rho(x, y, \alpha) = \frac{C \cdot \iint_{S(x,y,\alpha)} I(\chi, \eta) d\chi d\eta}{A}, \quad (1)$$

where A is the aforementioned area of TIR surface 55B, and S is the shape function of the TIR surface (e.g., rectangular). The power density $\rho(x, y, \alpha)$ approaches $C \cdot I(x, y)$ when the shape function S is a small pinhole.

For a traditional measurement of an intensity profile along the X-axis (i.e., the long axis) of line image 24, TIR prism input side 52B is oriented normal to the X-axis, is centered on Y-axis, is scanned parallel to the y-axis ($\alpha = \pi/2$, $y = 0 \forall x$), and covers all the width (short dimension) of the line image. The measurement result represents an approximation to the distribution in the long axis:

$$\rho\left(x, 0, \frac{\pi}{2}\right)$$

In the simplest but most common case, representing almost all useful applications, the intensity distribution is separable, i.e., $I(x, y) \approx i_x(x) \cdot i_y(y)$ so that:

$$\rho\left(x, 0, \frac{\pi}{2}\right) \xrightarrow[d \to 0]{} C \cdot i_x(x).$$

Figure 7:
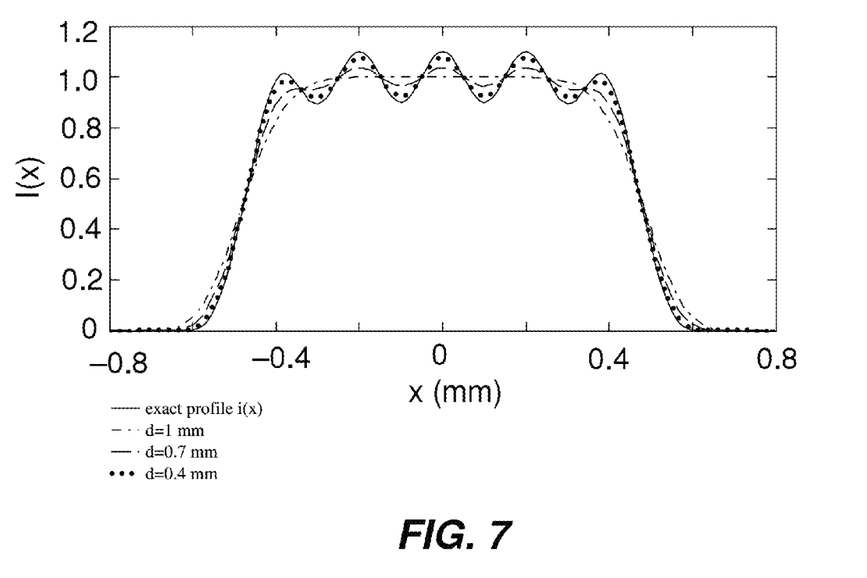
FIG. 7 is a plot of Intensity (relative units) versus x (mm) for different values of the slot width d, along with the exact profile for the line image of FIG. 6A, with a slot tilt angle $\alpha=90°$.

FIG. 7 plots the long-axis intensity distribution I(x) versus x (mm) for slit widths d of 1 mm, 0.7 mm, 0.4 mm and an ideal (exact) profile.

Figure 8:
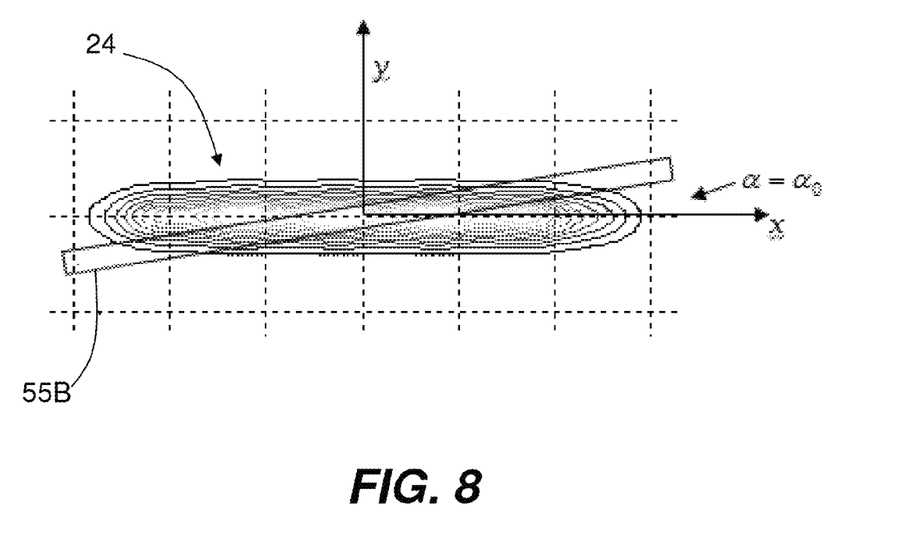
FIG. 8 is similar to FIG. 6B and shows a different slot size and slot tilt angle $\alpha$.

FIG. 8 is similar to FIG. 6B and illustrates an example of scanning slit aperture 55B in the Y-direction. Such a scan presents a signal described by the function $\rho(0, y, \alpha)$ as given by Eq. (1).

If again $I(x, y) \approx i_x(x) \cdot i_y(y)$, then it follows that:

$$\rho(0, y, \alpha) \xrightarrow[d \to 0, \alpha \to 0]{} C \cdot i_Y(y). \quad (2)$$

This provides a recipe for measuring an intensity distribution in the vertical axis. The maximum permissible sizes of d and α are dictated by the specified accuracy of the measurement.

Figure 9A:
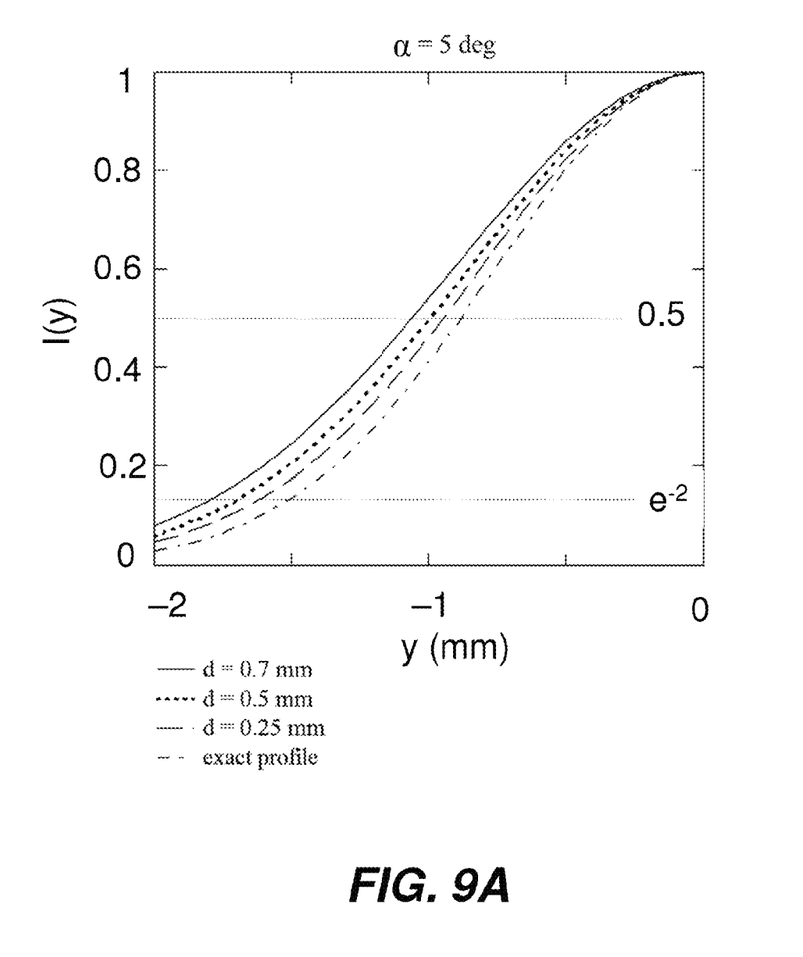
FIGS. 9A and 9B plot the relative intensity versus Y (mm) for a fixed slot angle $\alpha=5$ degrees and a different slot width d (FIG. 9A) and for a fixed slot width of d=0.25 mm and different slot angles $\alpha$.
Figure 9B:
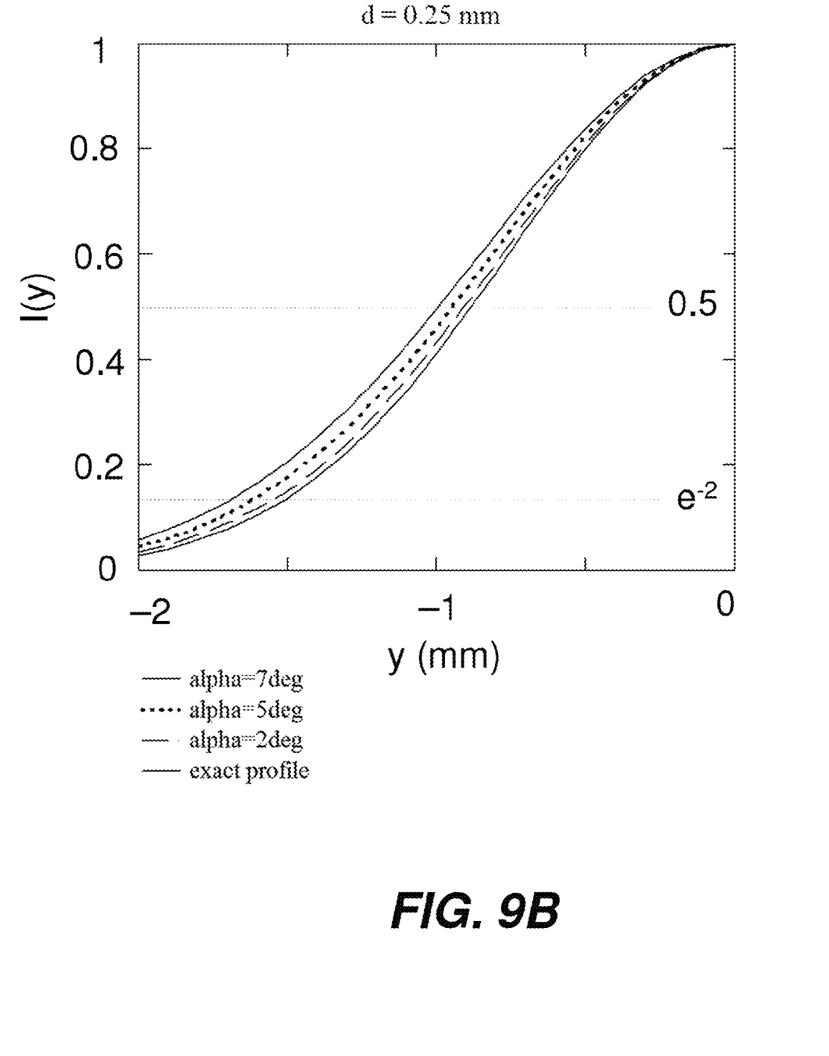

FIG. 9A plots the relative intensity I(y) versus y (mm) for an angle α=5 degrees and for values of d of 0.7 mm, 0.5 mm and 0.25 mm, as well as for the ideal profile (d→0 mm). FIG. 9B is similar to FIG. 9A and plots the relative intensity I(y) versus Y (mm) for d=0.25 mm and for values of angle α of 7 degrees, 5 degrees and 2 degrees, as well as for the ideal profile.

From FIGS. 9A and 9B, it is evident that if the light beam width is about 1 mm, then a slit measurement yields a relatively small systematic error, which can be taken into account in the final intensity measurement.

Figure 10A:
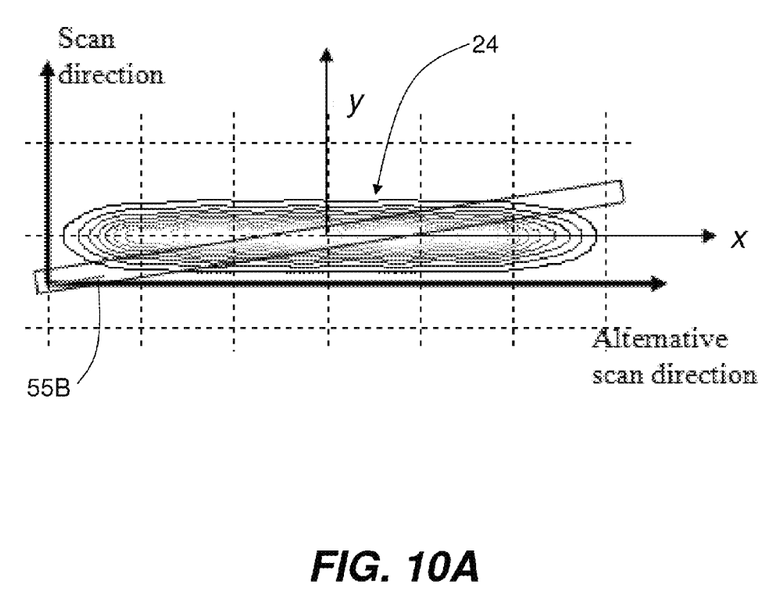
FIG. 10A is similar to FIG. 8 and shows an example of an alternative scan direction in the x-direction.
Figure 10B:
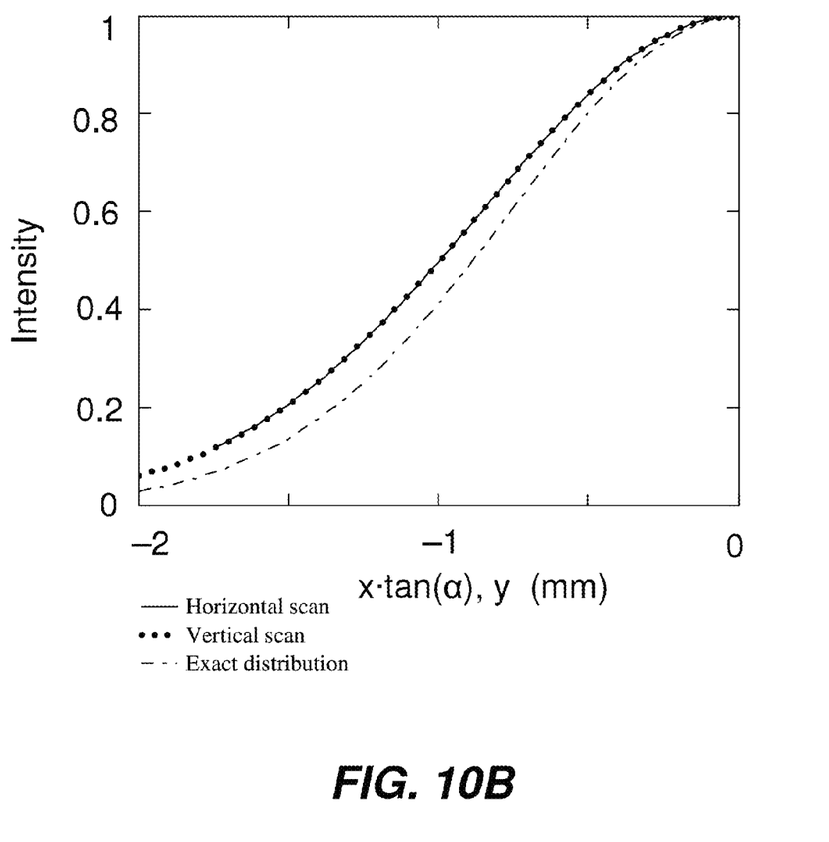
FIG. 10B is a plot of the relative intensity versus $x \cdot \tan(\alpha)$ showing the horizontal scan results, the vertical scan results, and the exact intensity distribution.

The system 10 can be simplified by recognizing that the results of a vertical (y) scan can be computed from a horizontal (x) scan. This means that the measurement setup requires only one translation stage. These scans are completely equivalent; one needs only to substitute the coordinate x with x·tan(α). FIG. 10A shows an example of an alternative scan direction in the X-direction, while FIG. 10B shows an example plot of the relative intensity versus x·tan(α).

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of measuring an intensity characteristic of a light beam, comprising:
   directing the light beam into a prism assembly that includes a thin prism sandwiched by two transparent plates, wherein the thin prism has a width d and a total-internal-reflecting (TIR) surface having an area;
   reflecting a portion of the light beam by the TIR surface to an integrating sphere while transmitting the remaining portion of the light beam through the two transparent plates to a beam dump;
   detecting a portion of the light captured by the integrating sphere; and
   determining an intensity characteristic of the light beam from the detected light.

2. The method of claim 1, wherein detecting the portion of the light captured by the integrating sphere measures an amount of optical power, and further including determining an intensity by dividing the measured amount of optical power by the area of the TIR surface.

3. The method according to claim 1, further comprising repeating the acts therein to measure an intensity for different sections of the light beam to determine an intensity profile for the light beam.

4. The method according to claim 3, further comprising translating the light beam relative to the prism assembly to measure the intensity for the different sections of the light beam.

5. The method according to claim 1, wherein the light beam comprises a line-forming beam that forms a line image.

6. The method according to claim 1, wherein the width d of the TIR prism is in the range from 0.05 mm to 1 mm.

7. The method according to claim 1, wherein the transparent plates have a substantially pentagonal shape and the thin prism has a substantially trapezoidal shape.

8. The method according to claim 1, wherein the thin prism has input and output surfaces configured so that the light beam passes through the input surface at substantially a right angle and the reflected portion of the light beam passes through the output surface at substantially a right angle.

9. The method according to claim 8, wherein the input and output surfaces of the thin prism are coated with an anti-reflection coating.

10. The method according to claim 1, wherein the thin prism and transparent plates have light-transmitting surfaces and wherein the light-transmitting surfaces are coated with an anti-reflection coating.

11. The method according to claim 1, wherein directing the light beam into a prism assembly includes focusing the light beam so that it substantially focuses at the TIR surface.

12. The method according to claim 1, wherein the light beam has an amount of optical power between 10 W and 5 kW.

13. A system for measuring an intensity characteristic of a light beam, comprising:
   a prism assembly arranged to receive the light beam at an input side, the prism assembly including a thin prism sandwiched by two transparent plates, wherein the thin prism has a width d and a total-internal-reflecting (TIR) surface, wherein the TIR surface reflects a portion of the light beam, thereby defining an unreflected portion of the light beam;
   an integrating sphere arranged adjacent a first output side of the prism assembly to receive the reflected portion of the light beam;
   a beam dump arranged adjacent a second output side of the prism assembly and arranged to receive the unreflected portion of the light beam;
   a photodetector operably arranged relative to the integrating sphere and adapted to measuring an amount of optical power received by the integrating sphere and generating an electrical detector signal representative of the measured amount of optical power; and
   a processor electrically connected to the photodetector and that includes instructions embodied in a computer-readable medium that cause the processor to determine the intensity characteristic of the reflected portion of the light beam.

14. The system according to claim 13, wherein the TIR surface has an area and wherein the processor determines an intensity by dividing the measured amount of optical power by the TIR surface area.

15. The system according to claim 13, wherein the width d of the TIR prism is in the range from 0.05 mm to 1 mm.

16. The system according to claim 13, further comprising a movable stage that movably supports the prism assembly relative to the light beam.

17. The system according to claim 13, wherein the transparent plates have a substantially pentagonal shape and the thin prism has a substantially trapezoidal shape.

18. The system according to claim 13, wherein the thin prism has input and output surfaces configured so that the light beam passes through the input surface at substantially a right angle and the reflected portion of the light beam passes through the output surface at substantially a right angle.

19. The system according to claim 13, wherein the thin prism and transparent plates have light-transmitting surfaces and wherein the light-transmitting surfaces are coated with an anti-reflection coating.

20. The system according to claim 13, wherein the light beam is substantially focused at the TIR surface.

21. The system according to claim 13, further comprising means for scanning the light beam relative to the prism assembly.

22. The system according to claim 12, wherein the light beam has an amount of optical power between 10 W and 5 kW.

* * * * *